(12) United States Patent
Duffy et al.

(10) Patent No.: US 9,098,269 B2
(45) Date of Patent: Aug. 4, 2015

(54) SYSTEM AND METHOD TO ENSURE RESOURCE ACCESS SAFETY WITH IMMUTABLE OBJECT TYPES

(71) Applicant: Microsoft Corporation, Redmond, WA (US)

(72) Inventors: John J. Duffy, Seattle, WA (US); Jared Porter Parsons, Kirkland, WA (US); Michael Sinz, Duvall, WA (US); Alexander Daniel Bromfield, Seattle, WA (US); Krzysztof J. Cwalina, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 8 days.

(21) Appl. No.: 13/734,750

(22) Filed: Jan. 4, 2013

(65) Prior Publication Data

US 2014/0196008 A1    Jul. 10, 2014

(51) Int. Cl.
*G06F 9/44* (2006.01)
*G06F 9/45* (2006.01)

(52) U.S. Cl.
CPC ............... *G06F 8/315* (2013.01); *G06F 8/436* (2013.01); *G06F 8/437* (2013.01)

(58) Field of Classification Search
None
See application file for complete search history.

(56) References Cited

U.S. PATENT DOCUMENTS

| | | | |
|---|---|---|---|
| 5,701,458 A | 12/1997 | Bsaibes et al. | |
| 6,438,560 B1 * | 8/2002 | Loen | 707/769 |
| 6,510,460 B1 | 1/2003 | Callsen et al. | |
| 6,675,378 B1 | 1/2004 | Schmidt | |
| 6,925,638 B1 * | 8/2005 | Koved et al. | 717/155 |
| 7,058,943 B2 | 6/2006 | Blais et al. | |
| 7,096,456 B2 | 8/2006 | Hanson et al. | |
| 7,603,664 B2 * | 10/2009 | Dutt et al. | 717/153 |
| 7,739,466 B2 * | 6/2010 | Rozas et al. | 711/163 |
| 7,774,376 B1 | 8/2010 | Meijer et al. | |
| 7,912,863 B1 | 3/2011 | Meijer et al. | |
| 7,921,143 B2 | 4/2011 | Dussud et al. | |
| 8,132,093 B2 | 3/2012 | Lammel et al. | |

(Continued)

OTHER PUBLICATIONS

Gordon, et al.,"Uniqueness and Reference Immutability for Safe Parallelism" In Proceedings of the ACM international conference on Object oriented programming systems languages and applications, Oct. 19, 2012, 20 pages.

(Continued)

*Primary Examiner* — Don Wong
*Assistant Examiner* — Devayani R Talukdar
(74) *Attorney, Agent, or Firm* — Kevin Sullivan; Aaron Hoff; Micky Minhas (57) ABSTRACT

A language extension that advances safety in system programming in that an entire type may be declared to be immutable in the case in which all instances of that type are immutable. The immutable type declaration automatically causes any instances of that type to be treated as immutable, and automatically causes all directly or indirectly reachable members (e.g., fields, methods, properties) of the instance to also be treated as immutable. Furthermore, any construction time reference that allows for field assignment of the instance is not permitted to survive beyond the point at which the instance becomes accessible to its creator. Accordingly, this instance, and any other instance of that same type, will be immutable from the very time of construction. The ability to classify all such instances as immutable is beneficial as the immutable characteristic permits actions that normally would not be allowed due to resource access safety.

21 Claims, 3 Drawing Sheets

(56) References Cited

U.S. PATENT DOCUMENTS

| | | | |
|---|---|---|---|
| 8,141,063 B2 | 3/2012 | Foley | |
| 8,281,293 B2* | 10/2012 | Fulton et al. | 717/151 |
| 8,282,293 B2* | 10/2012 | Ono | 396/358 |
| 8,321,632 B2 | 11/2012 | Revanuru | |
| 8,347,266 B2* | 1/2013 | Meijer et al. | 717/116 |
| 8,527,946 B2* | 9/2013 | Vaziri-Farahani et al. | 717/116 |
| 8,533,413 B2* | 9/2013 | Brunswig et al. | 711/163 |
| 8,589,951 B2* | 11/2013 | Krishnamurthy et al. | 719/318 |
| 2006/0036570 A1 | 2/2006 | Schaefer et al. | |
| 2006/0036656 A1* | 2/2006 | Mercer | 707/203 |
| 2007/0056042 A1 | 3/2007 | Qawami et al. | |
| 2007/0203960 A1 | 8/2007 | Guo | |
| 2008/0010451 A1 | 1/2008 | Holtzman et al. | |
| 2008/0244516 A1 | 10/2008 | Meijer et al. | |
| 2008/0270482 A1 | 10/2008 | Hillberg et al. | |
| 2008/0294685 A1 | 11/2008 | Johnson | |
| 2009/0083348 A1 | 3/2009 | Johnson | |
| 2009/0119298 A1 | 5/2009 | Faitelson et al. | |
| 2009/0327999 A1 | 12/2009 | Duffy et al. | |
| 2010/0037212 A1* | 2/2010 | Meijer et al. | 717/142 |
| 2010/0115203 A1 | 5/2010 | White | |
| 2010/0257206 A1 | 10/2010 | Brown et al. | |
| 2010/0262801 A1 | 10/2010 | Duffy et al. | |
| 2010/0275191 A1 | 10/2010 | Duffy et al. | |
| 2011/0161610 A1 | 6/2011 | Gustafsson et al. | |
| 2011/0320734 A1 | 12/2011 | Revanuru | |
| 2013/0007703 A1 | 1/2013 | Auerbach et al. | |

OTHER PUBLICATIONS

Castegren, Elias "LAPS: A General Framework for Modeling Alias Management Using Access Permission Sets", In Proceedings of Master of Science Programme in Information Technology Engineering, Oct. 2012, 93 pages.

Balzer, et al.,"Selective Ownership: Combining Object and Type Hierarchies for Flexible Sharing", In Proceedings of FOOL 2012: 19th International Workshop on Foundations of Object-Oriented Language, Oct. 22, 2012, 10 pages.

U.S. Appl. No. 13/652,436, Duffy, et al., Expc: Inferring Uniqueness and Immutability from Expression Inputs, Filed Date: Oct. 15, 2012.

Khodorkovsky, Daniel, "A Summary of AliasJava and Some Related Works", Published on: Dec. 10, 2002, Available at: http://www.cs.umd.edu/class/fall2002/cmsc631/notes/khodod.pdf.

Hawblitzel, et al., "Type System Support for Dynamic Revocation", In Second Workshop on Compiler Support for System Software, May 6, 2010, 10 pages.

Naden, et al., "A Type System for Borrowing Permissions", In 39th Annual ACM SIGPLAN-SIGACT Symposium on Principles of Programming Languages, Jan. 25, 2012, 14 pages.

Zhou, et al., "SafeDrive: Safe and Recoverable Extensions Using Language-Based Techniques", Retrieved on: Nov. 26, 2012, Available at: https://131.106.3.253/events/osdi06/tech/full_papers/zhou/zhou.pdf.

Srinivasan, et al., "Kilim: Isolation-Typed Actors for Java", In ECOOP— Object-Oriented Programming, Lecture Notes in Computer Science , vol. 5142, 25 pages.

U.S. Appl. No. 12/649,252 , Gustafsson, et al., "Compiler-Enforced Agent Access Restriction", Filed Date: Dec. 29, 2009.

U.S. Appl. No. 12/429,874, Duffy, et al., "Concurrent Mutation of Isolated Object Graphs", Filed Date: Apr. 24, 2009.

U.S. Appl. No. 12/422,764, Duffy, et al., "Type System Support for Memory Isolation Permissions", Filed Date: Apr. 13, 2009.

U.S. Appl. No. 12/163,868, Duffy, et al., "Immutable Types in Imperitive Language", Filed Date: Jun. 27, 2008.

U.S. Appl. No. 13/652,436, Bromfield, et al., "Expc: Inferring Uniqueness and Immutability from Expression Inputs", Filed Date: Oct. 15, 2012.

Finifter et al., "Verifiable functional purity in Java", Proceedings of the 15th ACM Conference on Computer and Communications Security, CCS 2008, Oct. 31, 2008, p. 161.

Mettler et al., "The Joe-E Language Specification, Version 1.0 (Technical Report No. UCB/EECS-2008-91)", Aug. 2008, retrieved from the Internet at: <<http://www.eecs.berkeley.edu/Pubs/TechRpts/2008/EECS-2008-91.pdf>>.

Birka et al., "A practical type system and language for reference immutability", Proceedings of the 19th Annual ACM SIGPLAN Conference on Object-Oriented Programming, Systems, Languages, and Applications, OOPSLA 2004, vol. 39, Oct. 2004, p. 35.

U.S. Appl. No. 13/734,758, filed Jan. 4, 2013, Katzenberger et al.

U.S. Appl. No. 13/734,762, filed Jan. 4, 2013, Parsons et al.

Office Action dated Aug. 15, 2014 cited in U.S. Appl. No. 13/734,758.

"D Programming Language: Change Log", Available at least as early as Jan. 2012, 74 pages. Available at <<https://web.archive.org/web/20120110201529/http:/dlang.org/changelog.html>>.

"D Programming Language: Attributes", Available at least as early as Apr. 2012, 8 pages. Available at <<https://web. archive.org/web/20120402231813/http:/dlang.org/attribute>>.

"D Programming Language: Const and Immutable", Available at least as early as Jan. 2012, 6 pages. Available at <<https://web.archive.org/web/20120110201814/http:/dlang.org/const3.html>>.

Cehreli, Ali, "Programming in D: Learn to program in the D programming language", D.ershane Series, Available at least as early as Apr. 2012, 332 pages. Available at <<https://web.archive.org/web/20120514174625/http://ddili.org/ders/d.en/Programming_in_D.pdf>>.

Office Action dated May 23, 2014 cited in U.S. Appl. No. 13/734,762.

Zibin, et al., "Object and Reference Immutability using Java Generics", In Proceedings of the 6th Joint Meeting of the European Software Engineering Conference and the ACM SIGSOFT Symposium on the Foundations of Software Engineering, Sep. 3, 2007, 10 pages.

International Search Report & Written Opinion for PCT Patent Application No. PCT/US2014/010117, Mailed Date: Mar. 21, 2014, Filed Date: Jan. 3, 2014, 9 Pages.

International Search Report & Written Opinion for PCT Patent Application No. PCT/US2014/010112, Mailed Date: Apr. 3, 2014, Filed Date: Jan. 3, 2014, 11 Pages.

International Search Report & Written Opinion for PCT Patent Application No. PCT/US2014/010118, Mailed Date: Apr. 8, 2014, Filed Date: Jan. 3, 2014, 8 Pages.

Bjarne Stroustrup, "The C++ Programming Language, Third Edition—Chapter 10: Classes, Chapter 14: Exceptions, Section C.9: Memory Management", The C++ Programming Language, Third Edition, Jun. 1997, Addison Wesley, 80 pages.

Herbert Schildt, "C# 3.0: the Complete Reference (excerpt: pp. 607-608)", In C+3.0: The Complete Reference, Dec. 2008, McGraw Hill, 18 pages.

Ecma International, "ECMA-334: C# Language Specification, 4th Edition (excerpt: pp. 247-249)", Jun. 2006, Available at <<http://www.ecma-international.org/publications/filed/ECMA-ST/Ecma-334.pdf>>.

"ResourceDictionary and StaticResource References (Windows Store apps using C#/VB/C++ and XAML) (Windows)", Available at least as early as Jan. 29, 2013. Available at:http://msdn.microsoft.com/en-in/library/windows/apps/hh968442.aspx.

Chow, et al., "Understanding Data Lifetime via Whole System Simulation", In Proceedings of the 13th Conference on USENIX Security Symposium , Aug. 9, 2004, 16 pages.

Dillig, et al., "The CLOSER: Automating Resource Management in Java", In Proceedings of the 7th International Symposium on Memory Management, Jun. 7, 2008, 10 pages.

Office Action dated Jan. 23, 2015 cited in U.S. Appl. No. 13/734,758.

Office Action dated Jan. 30, 2015 cited in U.S. Appl. No. 13/734,762.

Office Action dated Apr. 21, 2015 cited in U.S. Appl. No. 13/734,758.

* cited by examiner

SYSTEM AND METHOD TO ENSURE RESOURCE ACCESS SAFETY WITH IMMUTABLE OBJECT TYPES

BACKGROUND

Computing systems obtain a high degree of functionality by executing software programs. Programs consist of computer-executable instructions that are kept in some persistent form, such as on a harddrive, a compact disk, a thumbdrive, flash memory, or the like. During execution, such computer-executable instructions may often be loaded in random access memory, and executed by one or more processors of the computing system, causing the computing system to perform tasks.

In object-oriented programming, these computer-executable instructions are organized into objects that interact through function calls, and that may have one or more properties. Managed code is code that runs in a managed environment that provides type safety, but may also provide memory management and exception handling. In managed code, objects have unbounded lifetimes, no restriction on storage, and methods of access restriction involve indirection or extra resources.

Systems level programming is based upon tight and efficient management of access to and lifetime of resources (such as objects) throughout the system. One common way to provide this tight management is to use an Application Program Interface (API) to manage the lifetime and access of the resource.

BRIEF SUMMARY

At least some embodiments described herein relate to a language extension that advances safety in system programming. In accordance with the language extension, an entire type may be declared to be immutable in the case in which all instances of that type are immutable. The immutable type declaration automatically causes any instances of that type to be treated as immutable, and automatically causes all directly or indirectly reachable members (e.g., fields, methods, properties) of the instance to also be treated as immutable. Furthermore, any construction time reference that allows for field assignment of the instance is not permitted to survive beyond the point at which the instance becomes accessible to the creator. Accordingly, this instance, and any other instance of that same type, will be immutable from the very time of construction.

The ability to classify all such instances as immutable is beneficial as the immutable characteristic permits actions that normally would not be allowed due to resource access safety. For instance, the instance may be shared amongst multiple components and multiple threads since there is no risk that these components and threads will somehow perform conflicting actions on the instance.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

In accordance with embodiments described herein, a language extension that advances safety in system programming is described in which an entire type may be declare as immutable. The immutable type declaration automatically causes any instances of that type to be treated as immutable, and automatically causes all directly or indirectly reachable members (e.g., fields, methods, properties) of the instance to also be treated as immutable. Furthermore, any construction time reference that allows for field assignment in the instance is not permitted to survive beyond the point at which the instance becomes accessible to the creator. Accordingly, this instance, and any other instance of that same type, will be immutable from the very time of construction. The ability to classify all such instances as immutable is beneficial as the immutable characteristic permits actions that normally would not be allowed due to resource access safety. For instance, the instance may be shared amongst multiple components and multiple threads since there is no risk that these components and threads will somehow perform conflicting actions on the instance.

Some introductory discussion of a computing system will be described with respect to FIG. 1. Then, the principles of a managed code system will be described with respect to FIG. 2. Finally, the principles of the language extension to declare immutable types will be described with respect to FIGS. 3 and 4.

Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. The memory may take any form and may depend on the nature and form of the computing system. A computing system may be distributed over a network environment and may include multiple constituent computing systems.

Figure 1:
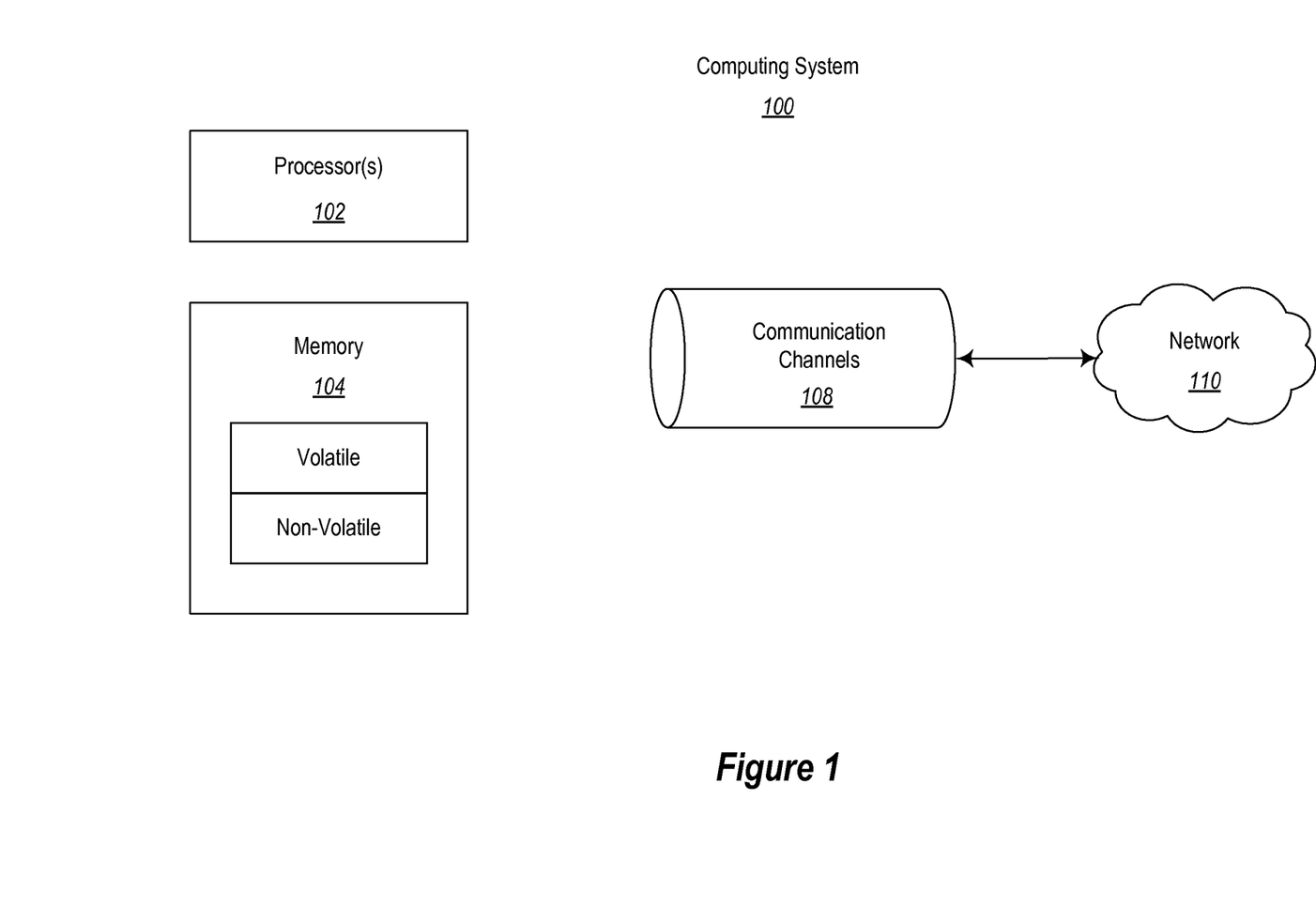
FIG. 1 abstractly illustrates a computing system in which some embodiments described herein may be employed.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "executable module" or "executable component" can refer to software objects, routings, or methods that may be executed on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory 104 of the computing system 100. Computing system 100 may also contain communication channels 108 that allow the computing system 100 to communicate with other message processors over, for example, network 110.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 2:
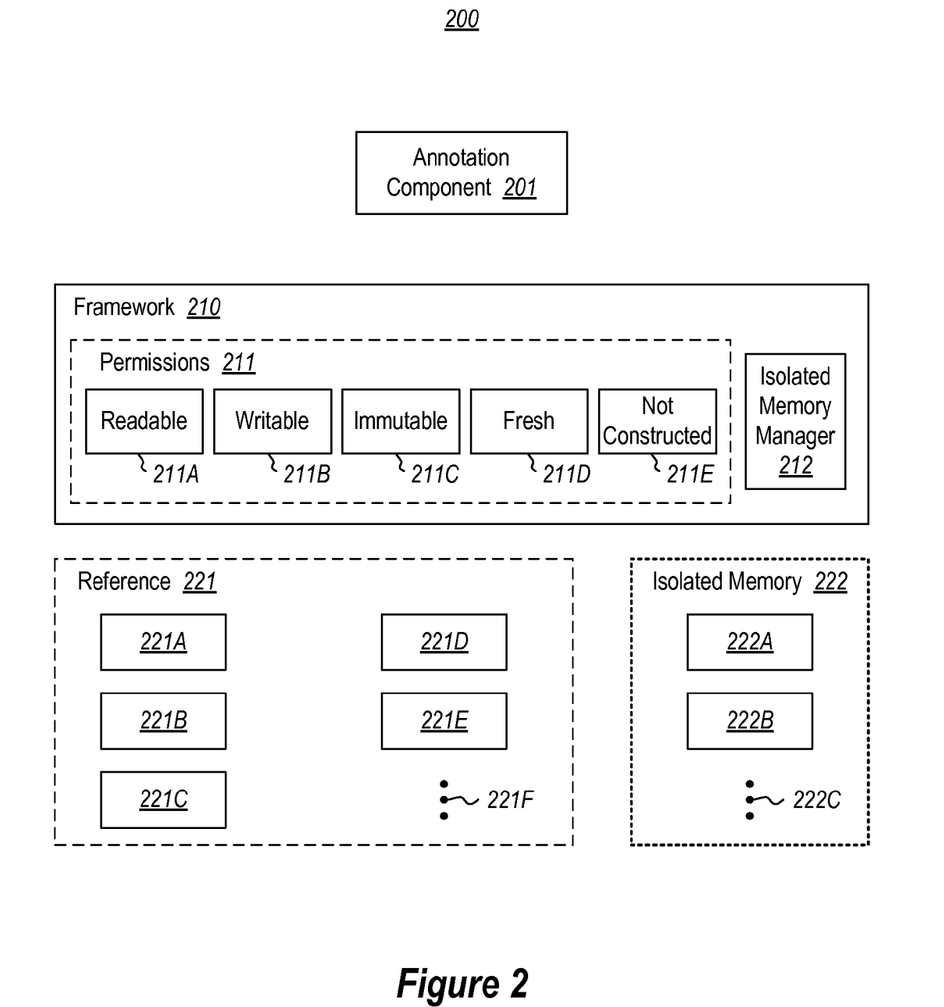
FIG. 2 abstractly illustrates a managed code system that represents an example environment in which the embodiments described herein may be employed.

FIG. 2 illustrates an environment 200 in which the principles described herein may operate. The environment 200 includes framework 210 that tracks the isolation and mutability of object graphs. The framework 210 organizes various references 221 to object graphs by controlling access to the reference. A reference may be a local variable, a method parameter, an object field, or any other reference to an object graph. In the illustrated embodiment, references 221 are illustrated as including references 221A through 221E, although the ellipses 221F symbolically represent that the framework 210 may manage access to any number of references 220.

The framework 210 manages access to the references 221 by assigning permissions to the references. A "permission" is an annotation on a reference which indicates some property about whether the reference can be mutated. Such permissions are abstractly represented by permissions 211 in FIG. 2. The permissions include readable permissions 211A, writable permissions 211B and immutable permissions 211C.

The "readable" permission 211A means that the corresponding object (and all of its directly and indirectly reachable members) may only be read from.

The "writable" permission 211B means that the corresponding object may be written to.

The "immutable" permission 211C is like the readable permission 211A, but further guarantees that no one else has a writable reference to this object. The immutable permission 211C may further guarantee that there will never again be a writable reference to this object. Thus, an immutable permission 211C means that the corresponding object will never be written to (and all of its directly and indirectly reachable members will never be written to), and similarly all of its fields, and all of its field's fields, and so forth, will never be written to. All static fields in an object are treated as having the immutable permission 211C by the framework 210.

The "fresh" permission 211D signifying that 1) there are no external references to the particular object graph (or any object within the particular object graph) referenced by the returned reference, and 2) there are no mutable references within the object graph to any objects outside of the object graph. The "not constructed" permission 211E will be described in further detail below.

The framework 210 also includes an isolated memory manager 212 which annotates memory locations as being isolated. The "isolated" annotation on a storage location means that the location stores a value which is externally unique. That is, for any object stored in that location, there are no external references to that object in the system, nor are there any references to any of the directly or indirectly reachable members of the object stored in that location. For instance, isolated memory manager 212 manages isolated memory locations 222. The isolated memory locations are illustrated as including two isolated memory locations 222A and 222B, though the ellipses 222C represents that the isolated memory locations 222 may include any number of isolated memory locations.

An annotation component 201 is built upon the framework 210. Alternatively or in addition, the annotation component 201 may operate as part of the framework 210. The annotation component 201 is configured to evaluate an executable component that returns a reference, such as one of the references 221 of FIG. 2.

This description addresses a challenge in a system dealing with reference permissions regarding how to represent a type which is always immutable once construction completes. The fields of these types are immutable and read-only and they cannot be mutated even through a writable reference. There simply exist no mechanism by which a mutation can occur. Hereinafter, these types will be referred to as "immutable types" and everything else as 'mutable types'.

Immutable types are common in systems programming because they represent a piece of data which can be freely shared amongst different components and different threads. There is no danger than one component could mutate the data in such a way that the effects were observable to another component.

A first challenge in classifying immutable types is that immutable types often take input parameters classified as "writable" to their constructors. However, the writable input is not stored in a field, else the instance under construction, and hence the object type as a whole, could no longer be considered immutable, but instead would be a mutable type. Immutable types may, however, calculate some immutable data based off the writable input parameter and then store that final immutable value as a field. Thus, the immutable type retains its immutable characteristic from the point that the corresponding instances are constructed.

If an input to the constructor contained only immutable or fresh input, then the object can be promotable to "immutable". However, this rule does not result in all immutable objects being classified as immutable. For instance, consider the following pseudo-code example:

```
public class Container
{
    readonly immutable string m__name;
    readonly immutable string m__address;
    public Container(writable Student student)
    {
```

-continued

```
        m__name = student.Name;
        m__address = student.Address;
    }
}
```

In this example, a Container is immutable in practice after construction, yet the type Container takes in an input parameter called Student, which is declared to be writable. Hence, the rule (that if an input to the constructor contained only input parameters with immutable or fresh permissions, then the object can be promotable to "immutable") would hence disqualify this type from being promoted to immutable because it took in writable input. It would allow a maximum permission of readable.

The second challenge is defining common storage for immutable and non-immutable types. In programming, it is advantageous to define a location that can be the storage for any object such that the stored value can be retrieved with the original state. This breaks down when the storage location needs to accept mutable and immutable types because there is no possible permission which works for both types. Consider the following pseudo-code example:

```
writable Student student = ...;
immutable string name = ...;
??? object storage;
if (condition) {
    storage = name;
}
else {
    storage = student;
}
```

In this example, there is no way to pick a permission for the "storage" locale that will allow assignment from both "student" and "name" and allow them to be retrieved with their original permission. Every permission has a problem. For instance, the "writeable" permission would prevent "name" from being assigned because an immutable reference cannot be stored in a reference marked as "writable". The "immutable" permission would prevent "student" from being assigned because a writable reference cannot be stored in an immutable location. The "readable" permission would prevent assignment to and retrieval from "storage" because the assigned and retrieved values would have a different permission than they originally possessed.

The principles described herein solve these problems by introducing the concept of an immutable type. This is an explicit annotation the user adds to a type declaration to indicate all instances of the type are immutable. For instance, although the principles described herein are not limited to the way in which an immutable type is declared, consider the following example pseudo-code:

```
immutable class String {
    ...
}
```

Figure 3:
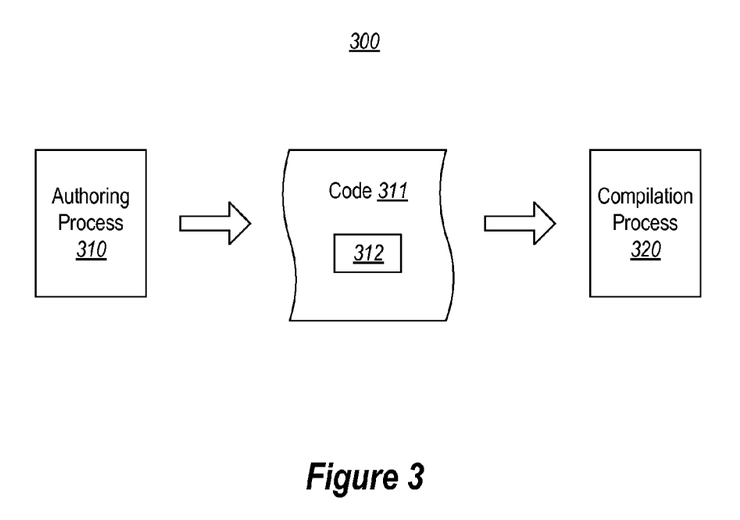
FIG. 3 illustrates an environment that includes an authoring environment in which source code in which immutable type declarations may be made in accordance with the principles described herein.

FIG. 3 illustrates an environment 300 in which the principles described herein may be employed. An authoring processes 310 (such as an authoring program) allows a programming or other programming entity (such as software) to generate code 311 (such as source code or intermediate language code) that includes an immutable type declaration 312, an example of which is shown immediately above. The compiler 320 then compiles the code 311, and thereupon encounters the immutable type declaration 312.

Figure 4:
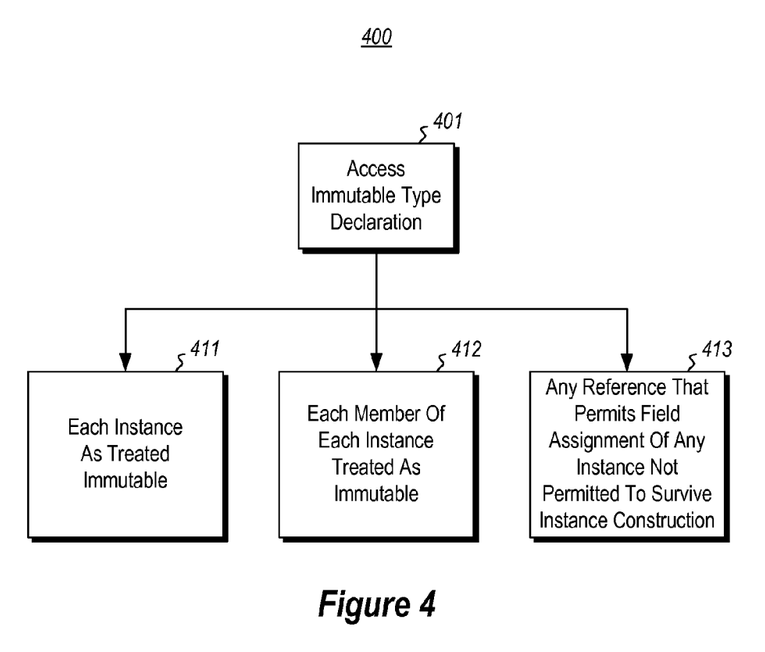
FIG. 4 illustrates a flowchart of a method for ensuring multiple instances of an object type are immutable in accordance with embodiments described herein.

FIG. 4 illustrates a flowchart of a method 400 for ensuring multiple instances of an object type are immutable. The method 400 may be performed by a compiler upon accessing a declaration that an object type is immutable (act 401). For instance, in reference to FIG. 3, the method 400 may be performed upon the compiler 320 access the immutable type declaration 312.

In response to the declaration, the compiler automatically formulates computer-executable instructions such that each instance of that object type is classified as immutable (act 411). This causes all other instances of the immutable type to be implicitly "immutable". Furthermore, all directly or indirectly reachable members of the instance of that object type are classified as immutable (act 412). For instance, all types, fields, methods and properties that are directly or indirectly reachable by the instance are implicitly tagged with the immutable permission. In addition, any reference that allows for field assignment of the instance of that object at construct time is not permitted to survive beyond the point at which the instance becomes accessible to the creator (act 413). As an example, the permission of "this" in the constructor is implicitly assigned a permission called "not constructed". This permission is illustrated as the "not constructed" permission 211E in FIG. 2.

A key property of immutable types is they are allowed to mutate their state during construction, but once construction completes, any instance constructed from the immutable type cannot mutate ever again (and hence are immutable). The following post construction rules are then enforced: 1) the fields are immutable and hence cannot themselves change, 2) all constructed instances of an immutable type are immutable and hence they cannot reassign their fields (any member which attempted to reassign or mutate a field would be caught at compilation time).

Mutation during construction is achieved with the "not constructed" permission 211E (see FIG. 2). This permission allows for fields to be read from and written to the targeted reference. In order to maintain the invariants of immutability the "this" reference which allows for field assignments cannot be allowed to outlive the constructor. It would present a problem if the reference could be stored away with the "not constructed" permission on a writable input and used after the constructor completed to further mutate the object. Nor can the "this" value be viewable as a completely constructed Address object until the constructor completes. It would allow the Address object to masquerade as immutable even though it was still being changed. Consider the following pseudo-code example:

```
public immutable class Address
{
    public Address(out notconstructed Address p)
    {
        p = this;
        Address address = this;
    }
}
```

If either of the above assignments from "this" were legal then it would allow for a fully constructed Address instance to be seen as mutating. This "not constructed" permission prevents either assignment. This permission is not statable by the user and hence cannot appear on any storage location. The above parameter declaration in the pseudo code example would simply be illegal from the compiler perspective. The "not constructed permission" is also not convertible to any other permission type (even readable). This guarantees it will not ever outlive the constructor because it is not possible to define a location that stores it.

These restrictions mean that once an immutable type finishes construction, it is always immutable. Hence all instances of a constructed immutable type are implicitly tagged with the immutable permission. Any permission the user attaches to the type, including writable, is simply ignored by the type system. Mutations are simply not possible hence the permission is no longer relevant.

Since the instance cannot ever cause a mutation, instances of the immutable type may now be allowed to be stored into locations that are marked for mutation. Consider the following pseudo-code example:

```
string s1 = "test";
immutable string s2 = s1;
writable string s3 = s1;
writable object o1 = s1;
```

Thus, this once again allows for common storage for immutable and mutable types. Furthermore, objects that might not otherwise be considered immutable may now be safely classified as immutable, allowing the instances to be safely shared amongst different processes, without concern for those processes interfering with one another with respect to the use of the immutable object.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer-implemented method for ensuring multiple instances of an object type are immutable, the method comprising:
   accessing a declaration in software source code, the declaration comprising an express annotation to an object type, the declaration specifying that the object type is immutable; and
   in response to accessing the declaration, performing the following:
      automatically formulating computer-executable instructions that enforce each instance of the object type to be classified as immutable once constructed, including formulating computer-executable instructions that ignore any user-specified permission for the object type such that all instances of the object type are immutable even if a mutable permission is assigned;
      automatically formulating computer-executable instructions that enforce all directly or indirectly reachable members of the instance of the object type to be classified as immutable; and
      automatically formulating computer-executable instructions that enforce any reference that allows for field assignment of the instance of the object time to be not permitted to survive beyond the point at which the instance becomes accessible to a creator of the instance.

2. The computer-implemented method in accordance with claim 1, wherein at least one instance of the immutable object type takes one or more writable input values.

3. The computer-implemented method in accordance with claim 2, wherein none of the one or more writable input values are stored in a field of any of the at least one instance.

4. The computer-implemented method in accordance with claim 1, wherein one or more members of an instance of the reference includes a permission that is not an immutable permission.

5. The computer-implemented method in accordance with claim 1, wherein there is no mechanism to make any of the instances of the object type mutable.

6. The computer-implemented method in accordance with claim 1, wherein members of the instance comprises all fields, methods, and properties of the instance.

7. The computer-implemented method in accordance with claim 1, wherein the reference that allows for field assignment is a this reference of an instance constructor that constructs instances of the object type.

8. The computer-implemented method in accordance with claim 1, wherein a set of one or more actions that may be performed on the reference that allows for field assignment are limited such that the reference is not stored as a field.

9. The computer-implemented method in accordance with claim 8, wherein the set of one or more actions includes read and write.

10. The computer-implemented method in accordance with claim 1, further comprising formulating an object graph comprising references to objects, including assigning a permission for each reference in the object graph, wherein:
    formulating computer-executable instructions that enforce all directly or indirectly reachable members of the instance of the object type to be classified as immutable includes marking each reference to each directly or indirectly reachable member as immutable in the object graph.

11. A computer program product comprising one or more hardware storage devices having stored thereon computer-executable instructions that, when executed by one or more processors of a computing system, cause the computing system to perform a method for ensuring multiple instances of an object type are immutable, the method comprising:
    accessing a declaration in software source code, the declaration comprising an express annotation to an object type, the declaration specifying that the object type is immutable; and
    in response to accessing the declaration, performing the following:
        automatically formulating computer-executable instructions that enforce each instance of the object type to be classified as immutable once constructed, including formulating computer-executable instructions that ignore any user-specified permission for the object type such that all instances of the object type are immutable even if a mutable permission is assigned;
        automatically formulating computer-executable instructions that enforce all directly or indirectly reachable members of the instance of the object type to be classified as immutable; and
        automatically formulating computer-executable instructions that enforce any reference that allows for field assignment of the instance of the object time to be not permitted to survive beyond the point at which the instance becomes accessible to a creator of the instance.

12. The computer program product in accordance with claim 11, wherein at least one instance of the immutable object type takes one or more writable input values.

13. The computer program product in accordance with claim 12, wherein none of the one or more writable input values are stored in a field of any of the at least one instance.

14. The computer program product in accordance with claim 11, wherein one or more members of an instance of the reference includes a permission that is not an immutable permission.

15. The computer program product in accordance with claim 11, wherein there is no mechanism to make any of the instances of the object type mutable.

16. The computer program product in accordance with claim 11, wherein members of the instance comprises all fields, methods, and properties of the instance.

17. The computer program product in accordance with claim 11, wherein the reference that allows for field assignment is a this reference of an instance constructor that constructs instances of the object type.

18. The computer program product in accordance with claim 11, wherein a set of one or more actions that may be performed on the reference that allows for field assignment are limited such that the reference is not stored as a field.

19. A system comprising:
    one or more hardware processors; and
    one or more hardware storage devices having stored thereon computer-executable instructions that, when executed by the one or more hardware processors, cause the system to implement a compiler that is configured to perform at least the following:
    accessing a declaration in software source code, the declaration comprising an express annotation to an object type, the declaration specifying that the object type is immutable;
    in response to accessing the declaration, performing at least the following:
        automatically formulating computer-executable instructions that enforce each instance of the object type to be classified as immutable once constructed, including formulating computer-executable instructions that ignore any user-specified permission for the object type such that all instances of the object type are immutable even if a mutable permission is assigned;
        automatically formulating computer-executable instructions that enforce all directly or indirectly reachable members of the instance of the object type to be classified as immutable; and
        automatically formulating computer-executable instructions that enforce any reference that allows for field assignment of the instance of the object time to be not permitted to survive beyond the point at which the instance becomes accessible to a creator of the instance.

20. The system of claim 19, wherein at least one instance of the immutable object type takes one or more writable input values.

21. The system of claim 20, wherein none of the one or more writable input values are stored in a field of any of the at least one instance.

* * * * *

UNITED STATES PATENT AND TRADEMARK OFFICE
CERTIFICATE OF CORRECTION

PATENT NO.        : 9,098,269 B2                                    Page 1 of 1
APPLICATION NO.   : 13/734750
DATED             : August 4, 2015
INVENTOR(S)       : Duffy et al.

It is certified that error appears in the above-identified patent and that said Letters Patent is hereby corrected as shown below:

Claims

Claim 1
Line 15, change "object time" to --object type at construct time--

Claim 11
Line 17, change "object time" to --object type at construct time--

Claim 20
Line 19, change "object time" to --object type at construct time--

Signed and Sealed this
Twenty-eighth Day of June, 2016

Michelle K. Lee
*Director of the United States Patent and Trademark Office*